Nov. 13, 1923.
S. I. PHELPS
ELECTRIC HEATER
Filed Feb. 18, 1922
1,473,865
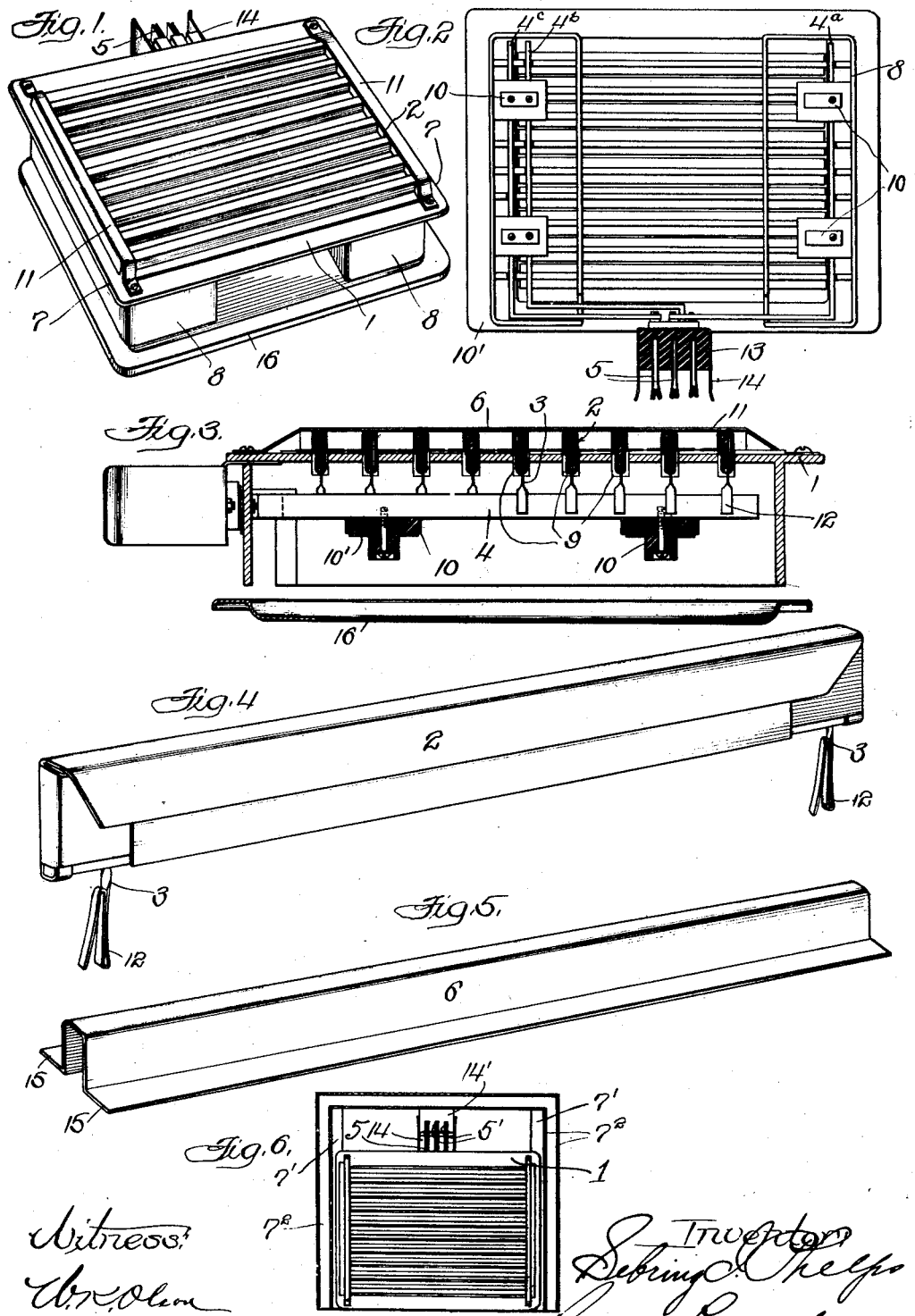

Patented Nov. 13, 1923.

1,473,865

UNITED STATES PATENT OFFICE.

SEBRING I. PHELPS, OF ROCKFORD, ILLINOIS.

ELECTRIC HEATER.

Application filed February 18, 1922. Serial No. 537,478.

*To all whom it may concern:*

Be it known that I, SEBRING I. PHELPS, a citizen of the United States of America, and a resident of Rockford, county of Winnebago, and State of Illinois, have invented a new and useful Improvement in Electric Heaters, of which the following is a specification.

The main objects of this invention are to provide an improved electric heater particularly adapted for use as a broiler and roasting unit; to provide an electric heater of this kind made up of a plurality of separate heating units constructed similar to those shown and described in my copending application, Serial No. 537,479, filed February 18, 1922; to provide an improved broiler and roasting unit particularly adapted for use in an electric oven of the type shown in United States Patent No. 1,376,829 dated May 3, 1921; to provide an improved arrangement of the heating units on a supporting frame so as to afford a direct support for food to be broiled or for a vessel containing food to be roasted; to provide improved means removable from the units which is adapted to protect the units from direct contact with the food when it is broiled and thereby facilitate the subsequent cleaning of the heater; to provide an improved heating device of this kind which is of light construction so that it may be readily handled in being placed in and removed from position for use; to provide an improved arrangement of the electrical conductors for said units whereby a predetermined number of contiguous units may be operated independently of the rest for use in cooking food not large enough to require the use of all the units; and to provide suitable means for collecting the juices or grease that oozes out of the food as it is broiled.

An illustrative embodiment of this invention is shown in the accompanying drawings, wherein—

Figure 1 is a perspective view of an electric broiler and roasting device constructed in accordance with this invention.

Figure 2 is a bottom plan of the same.

Figure 3 is an enlarged cross sectional view of the same.

Figure 4 is an enlarged perspective view of one of the individual heating units, a plurality of which make up the heater.

Figure 5 is a perspective view of one of the shields which are placed over the units when the heater is to be used for broiling purposes in order to prevent the food from coming directly into contact with the units.

Figure 6 is a plan, of reduced size, showing a heater of this kind in position in an oven of the type shown in the aforesaid patent.

An electric broiling and roasting device constructed in accordance with this invention embodies a plurality of separately constructed units arranged edgewise in rather widely spaced relation on a frame which is constructed to be slid into and out of an oven, the frame having contacts thereon connected with the units and adapted to engage coacting contacts arranged within the oven, the several units being provided with shields adapted to fit thereover so as to protect the units from direct contact with food that is to be broiled and thereby facilitate the subsequent cleaning of the device.

In the specific embodiment herein shown, the device comprises a frame 1 upon which heating units 2 are arranged on edge in spaced relation with contacts 3 connecting with bus bars 4, which through the medium of contacts 5 are adapted to be connected to a source of electricity when the device is to be put into use. Shields 6 are adapted to be arranged over the heating units 2 when the device is to be used as a broiler.

The frame 1 is of open rectangular shape and is provided with oppositely extending lateral flanges 7 which are adapted to slidably support the device on ledges $7^1$ within an electric oven $7^2$ of the general type shown in patent hereinbefore mentioned. On the under side of the frame adjacent the lateral edges thereof are depending rectangular shaped aprons or flanges 8 which provide supports for the bus bar holders and assist in maintaining the spacing of the units 2. These aprons are preferably integral with the frame 1. The edges of the frame inwardly of the flanges 7 and the upper edges of the inner and parallel parts of the depending aprons 8 have recesses 9 (Figure 3) formed therein to receive the heating units 2 and locate the same in definitely spaced relation.

The heating units 2 are constructed somewhat similar to the units shown in copending application hereinbefore identified, each comprising a core upon which the resistance material is spirally wound and connected at its end to contacts 3, the core being enveloped in a metal sheath or casing which is firmly folded around the core. These units are arranged on edge in the notches or recesses 9 with their upper faces disposed in substantially the same horizontal plane above the frame 1, and with spring clip ends 12 of the contacts 3 yieldingly engaging the bus bars 4.

In order to insure the retention of the units 2 on the frame 1, guards or plates 11 of L-shaped cross section are secured along the lateral edges of the frame 1 overlapping the ends of the units 2. These guards are detachably secured to the frame so that they may be conveniently removed and enable one to remove and replace one or all of the units 2.

The bus bars 4, of which there are preferably three, as herein shown are of L-shaped form and wedge-shaped cross section. Two of them are arranged at one side of the frame and one at the other side within the respective aprons 8. They are supported upon insulating blocks 10 which are suspended on the sides of the outer parts of the aprons 8 by clips 10¹ detachably connected to said apron. The transverse parts of the bars 4 are connected to the three spring contacts 5 (see Figure 2) seated in recesses in a block of insulating material 13 secured to the rear edge of the frame 1. The contacts protrude rearwardly beyond the block and are adapted to engage bus bars 5¹ arranged at the back of the oven, (see Figure 6). The block 13 is also equipped with a spring clip 14 which serves to coact with an insulating block 14¹ in the oven and insure proper engagement of the contacts 5 with the oven bus bars.

The relative arrangement of the bus bars 4 on the frame 1 and the contact 3 on the units 2, is such that one contact on each of the units engages the single bus bar 4ᵃ, and the contact 3 at the other end of the units engages one or the other of the bus bars 4ᵇ or 4ᶜ. Thus the units are connected in parallel in two circuits. Preferably these units are arranged so that the half of them which are contiguous to the front of the frame 1 are arranged in one circuit, and the remaining units are connected in the other circuit. Thus, in combination with the well-known multiple heat switch, one group of units can be operated independently of the other or the two operated in unison. When operated alone the one group of units operates at full capacity so that when food, which is not large enough to cover all of the units on the frame 1, is to be cooked it can be effected with maximum efficiency with the one group of units.

In order to facilitate the cleaning of the device, after it has been used for broiling food, a plurality of separately constructed shields 6 are arranged to be assembled upon the heating units 2. These shields, as more clearly indicated in Fig. 5, are of U-shaped cross section and have flanges 15 extending outwardly from the upper edges of the legs of the U-shaped part. These shields are adapted to yieldingly fit over the tops of the heating units 2 with the flanges disposed below the tops of said units, with a small space between the flanges of contiguous shields. These shields may be readily removed from the units after the food has been broiled, and washed and cleansed in the same way as any utensil would be. The food having been thus kept out of direct contact with the units themselves the cleaning of the broiler is made convenient and easy.

A tray 16, of suitable construction, is adapted to be arranged below the heater when it is used for broiling food so that juices or grease that ooze out of the broiling food are collected thereon as said juices or grease drain from the flanges 15 of the shields 16. In the preferred construction, this tray is adapted to slide into the oven on a pair of ledges below those which carry the flanges 7 of the frame 1.

The operation of an electric heating device such as that shown and described is briefly as follows:

For broiling purposes, the shields 6 are first placed upon the units 2 as shown in Figures 1, 2 and 3, and the steak or other food laid upon the shield protected units 2. The frame 1 is then slid into the oven so as to bring the contacts 5 into registration with the oven contacts 5¹. By means of the usual switches the current is turned on to the units 2 and left on until the food is suitably cooked. The frame 1 may be readily withdrawn from the oven to permit inspection of the food as it is cooking and to enable it to be turned over. The juices and grease that ooze out from the food drain from the flanges 15 of the shields 6 and are collected on the tray 16.

After the broiling has been completed the heater is removed from the oven and the shields 6 removed from the units and washed as any kitchen utensils would be washed, and the parts of the heater are wiped off with a damp rag.

When the unit is to be used for roasting, the shields 6 are not used and the utensil of food sets directly upon the heating units 2 within the oven.

Although but one specific embodiment of this invention has been herein shown and described, it will be understood that numerous details of the construction shown may be altered or omitted without departing from the spirit of this invention as defined by the following claims.

I claim:

1. An electric broiler comprising a frame, a plurality of separately constructed heating units arranged on said frame in rather widely spaced relation, with the top faces thereof disposed in the same horizontal plane and adapted to directly support thereon the food to be broiled, means for holding said units in place on said frame, and electrical means connecting said units with a source of electricity.

2. An electric broiler comprising a frame, a plurality of separately constructed heating units of long rectangular form and oblong cross section arranged on edge on said frame in rather widely spaced relation, with the top faces thereof disposed in the same horizontal plane and adapted to support the food to be broiled, means for holding said units in place on said frame, and electrical means connecting said units with a source of electricity.

3. An electric broiler comprising a frame, a plurality of separately constructed heating units of long rectangular form and oblong cross section arranged on edge on said frame in rather widely spaced relation, with the top faces thereof disposed in the same horizontal plane and adapted to support the food to be broiled, means for holding said units in place on said frame, and electrical means connecting in one circuit a portion of said units which are contiguous to each other and the remaining units in another circuit, whereby one group of units may be operated independently of the other, or both operated in unison.

4. An electric heater of the class described comprising a frame slidable in and out of an oven, a plurality of separately constructed flat narrow heating units of oblong cross section arranged on edge in said frame in spaced relation, contact members secured to the rear of said frame and insulated therefrom and adapted to engage other contacts in the oven, bus bars secured on the under side of said frame and extending from the front to the back thereof and connected at their rear ends to the respective contacts, other contacts on said units adapted to engage said bus bars.

5. An electric broiler comprising a frame, a plurality of separately constructed heating units arranged on said frame in rather widely spaced relation, with the top faces thereof disposed in the same horizontal plane and adapted to support the food to be broiled, means for holding said units in place on said frame, removable means adapted to be placed over said heating units to protect said units against direct contact with the food, and electrical means connecting said units with a source of electricity.

6. An electric broiler comprising a frame, a plurality of separately constructed heating units arranged on said frame in rather widely spaced relation, with the top faces thereof disposed in the same horizontal plane and adapted to support the food to be broiled, means for holding said units in place on said frame, a plurality of separately constructed shields adapted to be placed over the several heating units so as to protect the same against direct contact with the food, and electrical means connecting said units with a source of electricity.

7. An electric broiler comprising a frame, a plurality of separately constructed heating units of long rectangular form and oblong cross section arranged on edge on said frame in rather widely spaced relation, with the top faces thereof disposed in the same horizontal plane and adapted to support the food to be broiled, means for holding said units in place on said frame, a plurality of separately constructed shields of U-shaped cross section adapted to yieldingly fit over the several units so as to protect the same against direct contact with the food, and electrical means connecting said units with a source of electricity.

8. An electric broiler comprising a frame, a plurality of separately constructed heating units of long rectangular form and oblong cross section arranged on edge on said frame in rather widely spaced relation, with the top faces thereof disposed in the same horizontal plane and adapted to support the food to be broiled, means for holding said units in place on said frame, a plurality of separately constructed sheilds of U-shaped cross section each having outwardly disposed flanges at the edges of the legs of the U-shaped part, said shields being adapted to be placed in an inverted position upon the respective units with the flanges disposed below the tops of the units whereby said units are protected against direct contact with the food, and electrical means connecting said units with a source of electricity.

9. An electric broiler comprising a frame, a plurality of separately constructed heating units arranged on said frame in rather widely spaced relation, with the top faces thereof disposed in the same horizontal plane and adapted to support the food to be broiled, means for holding said units in place on said frame, electrical means connecting said units with a source of electricity, and a tray arranged below said frame.

Signed at Rockford this 14th day of February 1922.

SEBRING I. PHELPS.